(12) United States Patent
Barker et al.

(10) Patent No.: US 6,290,151 B1
(45) Date of Patent: Sep. 18, 2001

(54) SWING ARM GUIDANCE SYSTEM

(75) Inventors: Luke J. Barker, Deshler; Darin J. Neff, Hebron, both of NE (US)

(73) Assignee: Reinke Manufacturing Company, Inc., Deshler, NE (US)

(*) Notice: Subject to any disclaimer, the term of this patent is extended or adjusted under 35 U.S.C. 154(b) by 0 days.

(21) Appl. No.: 09/562,017

(22) Filed: May 2, 2000

(51) Int. Cl.$^7$ ....................................................... B05B 3/12
(52) U.S. Cl. ............................ 239/729; 239/69; 239/97; 701/50; 701/210; 701/215; 701/216
(58) Field of Search ................................ 239/69, 97, 726, 239/728–733, 743, 744, DIG. 15; 364/142, 147; 701/50, 210, 213, 215, 216; 180/168, 204, 400, 401

(56) References Cited

U.S. PATENT DOCUMENTS

| 3,797,517 | * | 3/1974 | Kircher et al. | 239/729 X |
| 3,902,668 | * | 9/1975 | Daugherty et al. | 239/729 |
| 4,340,183 | * | 7/1982 | Kegel et al. | 239/729 |
| 4,569,481 | * | 2/1986 | Davis et al. | 239/729 X |
| 5,334,987 | * | 8/1994 | Teach | 342/357 |
| 5,653,389 | * | 8/1997 | Henderson et al. | 239/69 |
| 5,904,296 | * | 5/1999 | Doherty et al. | 239/69 X |
| 5,919,242 | * | 7/1999 | Greatline et al. | 701/50 |
| 5,927,603 | * | 7/1999 | McNabb | 239/728 X |
| 5,955,973 | * | 9/1999 | Anderson | 701/215 X |
| 6,036,122 | * | 3/2000 | Gerdes et al. | 239/729 |
| 6,045,066 | * | 4/2000 | Gerdes et al. | 239/729 |
| 6,085,999 | * | 7/2000 | Gerdes et al. | 239/729 |
| 6,095,439 | * | 8/2000 | Segal et al. | 239/729 |

\* cited by examiner

Primary Examiner—David A. Scherbel
Assistant Examiner—Steven J. Ganey
(74) Attorney, Agent, or Firm—G. Brian Pingel

(57) ABSTRACT

A guidance system for providing a steering control for a swing arm on a center pivot irrigation system is provided through the use of two satellite signal receivers. A first signal receiver is located at the center pivot to provide calculated position information for a comparison with the known position of the center pivot. An error signal is generated and is utilized to adjust position information provided by the second signal receiver to produce an improved position information for the swing arm. Such improved position information is compared to the desired path of travel for the swing arm and a steering signal is generated therefrom, which steering signal controls the steering of the swing arm along its desired path of travel.

11 Claims, 3 Drawing Sheets

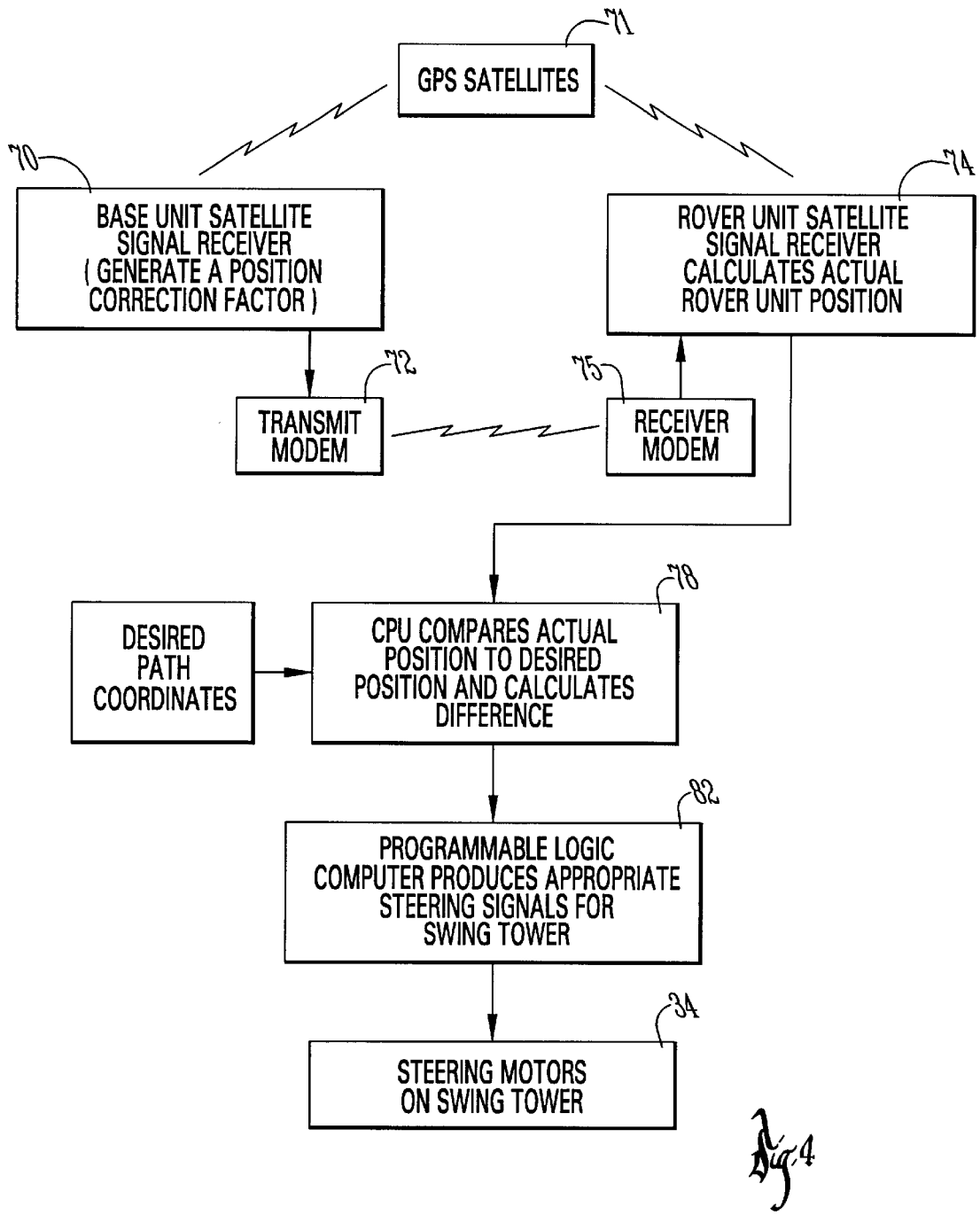

SWING ARM GUIDANCE SYSTEM

BACKGROUND OF THE INVENTION

1. Field of the Invention

The present invention relates in general to center pivot irrigation systems having swing arms for providing water to the corners of a field and more specifically relates to a guidance system that is utilized for controlling the travel of the swing arm on a desired path.

2. Description of the Prior Art

Center pivot irrigation systems have long been known in the art for providing water to large sections of land. A typical center pivot system is capable of irrigating one hundred and sixty acres or more. A center pivot system is formed of a main arm water conduit that is fixed at one end to a central point of water supply. The main arm is supported on a plurality of wheeled towers and is pivotally attached to the source of water to provide a circular irrigation pattern surrounding such supply.

Center pivot irrigation systems have proven to be highly efficient in irrigating large sections of land. They suffer from the deficiency that they produce a circular water pattern, although most fields are either rectangular or square shaped. Accordingly, a center pivot system by itself will not be able to provide water to the corners of a field, resulting in decreased production or complete loss of production therein. To increase the amount of area that can be watered by a center pivot system, high pressure sprayers known as end guns have been mounted on the end of the center pivot main arm and are actuated at the corners to produce a water spray into only a portion of the corners. Due to this fact, end guns are not an effective or efficient method for watering the corners and improved corner watering systems have been desired.

In the 1970's, the use of an additional watering arm (called a swing arm) was begun, with the swing arm being pivotally attached to the free end of the main arm to pivot out into the corners as desired. A variety of different methods for steering and driving the swing arm have been developed, but the most successful and predominantly used system for controlling the movement of the swing arm is through the use of an electromagnetically charged cable that is buried in the ground along the path that the swing arm is desired to follow. See U.S. Pat. No. 3,902,668 to Daugherty, et al.

Through the use of buried cable controls, swing arm center pivot irrigation systems have been improved in efficiency and operation. Nevertheless, there are certain drawbacks in such systems, particularly in instances where the topsoil of a field may overlie a rock substrata. In view of the fact that a buried cable system requires the laying of ten thousand or more feet of cable, when rock is present in a field, installation of the buried cable becomes unusually difficult and expensive. It is also very expensive to repair or to alter the path of the system once the cable is buried.

Other methods used to steer the swing arm include the use of encoders and angle comparisons or electrical control means with banks of switches and settings for the desired paths. See U.S. Pat. No. 4,340,183 to Kegel and U.S. Pat. No. 3,797,517 to Kircher, respectively.

Until recently the use of Global Positioning Satellite (GPS) data to guide the swing arm of a center pivot irrigation system would have been impractical from the standpoint that such position calculations were too inaccurate and GPS receiver/senders were prohibitively expensive.

The present invention is designed to provide a new and improved guidance system for the steering control of a swing arm on a center pivot system that overcomes the deficiencies of the prior art.

SUMMARY OF THE INVENTION

The present invention is a guidance system for providing a steering control for a swing arm on a center pivot irrigation system having a main arm water conduit with one end pivotally connected to a known central point of water supply at a known location and supported on at least one movable tower. The system includes a first satellite signal receiving means for producing position information representative of the calculated position of the known central point and a comparator means for comparing the known position of the central point with the calculated position information of said point and then generating an error signal representative of the difference therebetween.

A second satellite signal receiving means is located on the swing arm for producing position information representative of the calculated position of the swing arm. A first processing means is employed for using the error signal produced by the comparator means to adjust the position information produced by the second signal receiving means to generate corrected swing arm position information.

In a first preferred embodiment the corrected swing arm position information is sent to a second processing means where position information representative of the desired path of travel of the swing arm is stored and the corrected position information is compared to said desired path of travel information, producing therefrom a steering signal for the swing arm.

In a second preferred embodiment, a virtual position at a distance ahead of the actual position of the second satellite signal receiving means is calculated and used rather than its actual position. This allows the swing arm direction to be adjusted in a more timely manner and results in more tangential movement and more accurate positioning of the swing arm on the desired path of travel.

The foregoing and other advantages of the present invention will appear from the following description. In the description, reference is made to the accompanying drawings, which form a part hereof, and in which there is shown by illustration and not of limitation two specific forms in which the invention may be embodied. Such embodiments do not represent the full scope of the invention, but rather the invention may be employed in a variety of other embodiments and reference is made to the claims herein for interpreting the breadth of the invention.

BRIEF DESCRIPTION OF THE DRAWINGS

FIG. 4 is a Block diagram of the logic path for the first preferred embodiment of the guidance system of the present invention.

DETAILED DESCRIPTION OF THE PREFERRED EMBODIMENT

Figure 1:
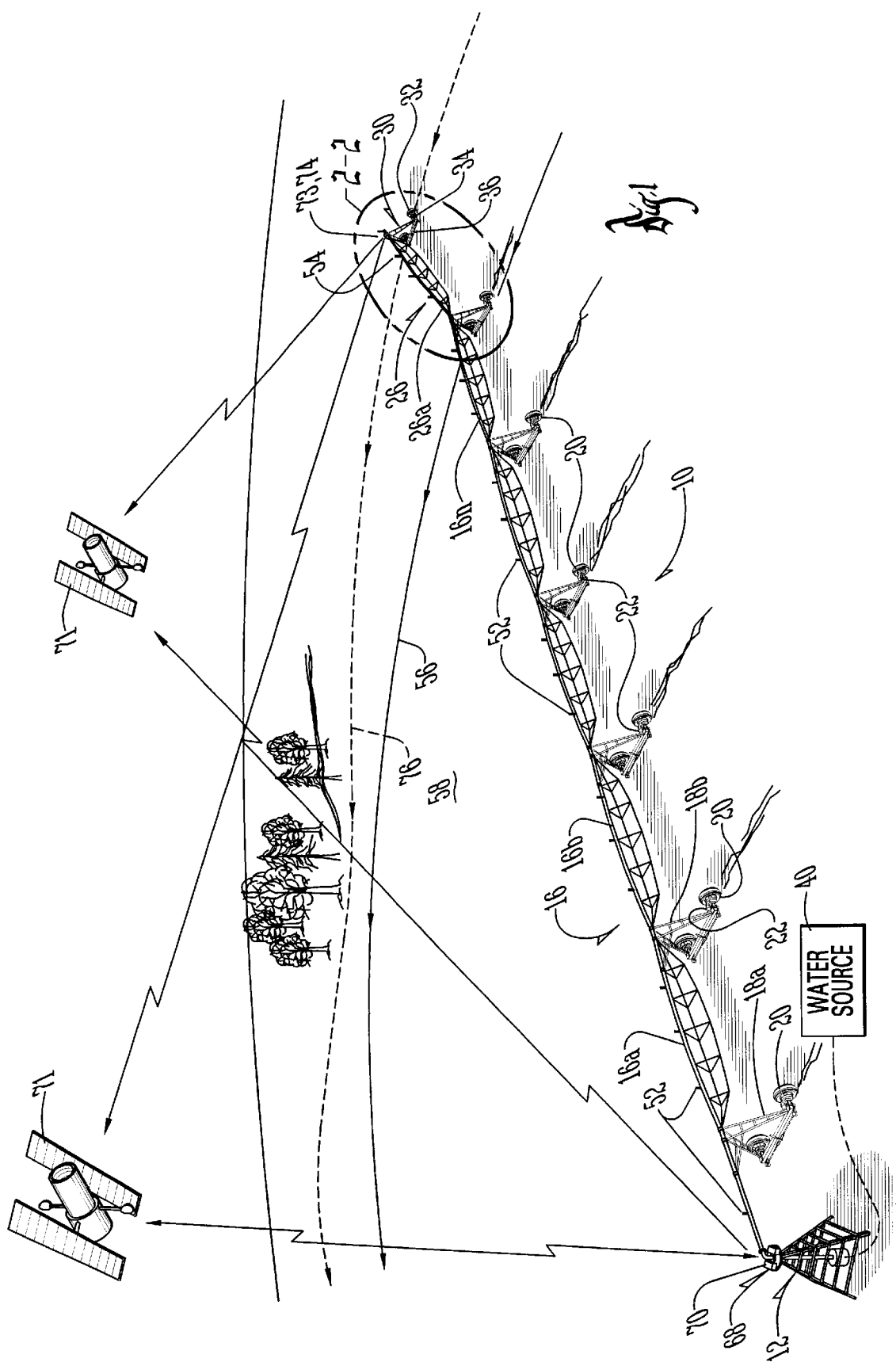
FIG. 1 is a simplified pictorial diagram showing a center pivot irrigation system with a main boom and a swing arm that is controlled by the guidance system of the present invention and two GPS satellites that are used by such guidance system.
Figure 2:
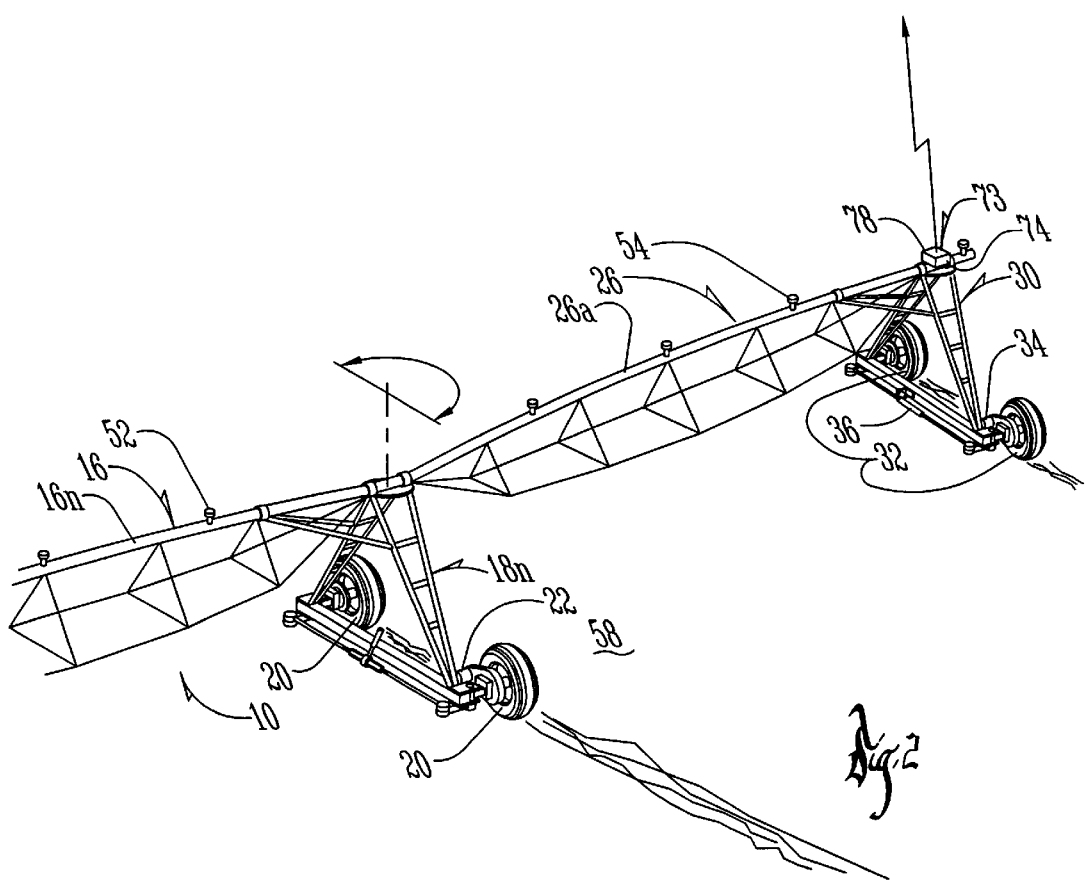
FIG. 2 is a more detailed view of the swing arm and guidance system of FIG. 1.

FIG. 1 shows a swing arm center pivot irrigation system generally at 10. A center pivot 12 for the system 10 is stationary and connected to a main boom 16 which can be comprised of several separate boom sections 16a, 16b . . . 16n. Such boom sections are supported by means of supporting towers 18a through 18n, each of which have wheels 20 and drive motors 22. A swing arm 26 (best shown in FIG. 2) normally is comprised of only one boom section 26a and is pivotally connected at 28 to the outer end of boom section 16n. The swing arm 26 is supported by a swing tower 30 which has wheels 32 and drive motors 34 for mobility. The wheels 32 on the tower 30 are steerable by the use of steering means 36.

As is well known in the art, the center pivot 12 is connected to a source of water, such as a well 40. Water is supplied from the well 40 along the lengths of the main boom 16 and the swing arm 26 for delivering a desired amount of water to sprinkler heads such as shown respectively at 52 and 54 (shown only in FIG. 2).

Figure 3:
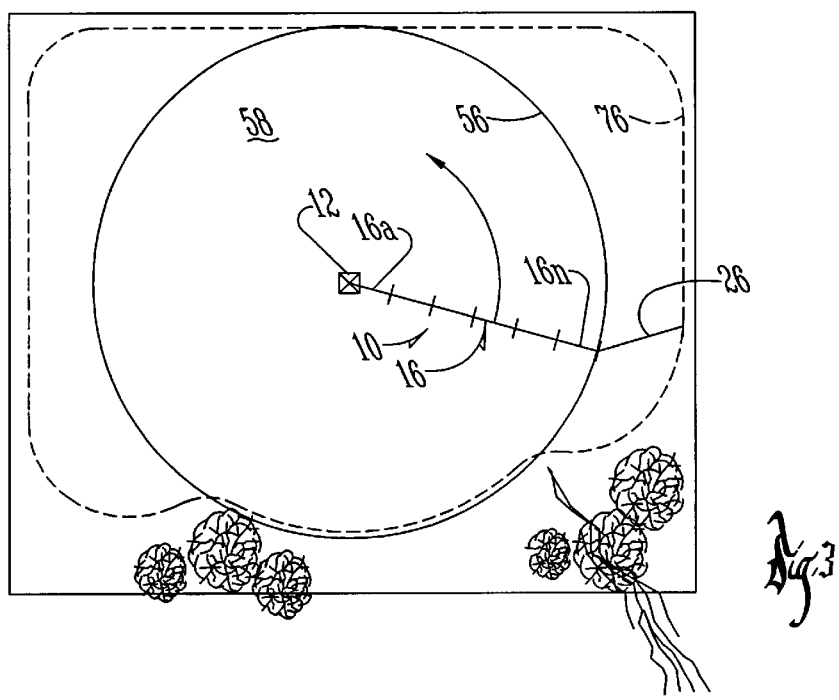
FIG. 3 is a diagrammatic view of the paths that the swing arm and main boom will travel.

As indicated in FIG. 3, the main boom 16 is only capable of covering a circular area 56 around the center pivot 12. When pivoted about the outer end of the outer section 16n at 28 the swing arm 26 permits irrigation of a section of the field 58 outside of the circular area 56. The present invention is designed to provide an efficient and accurate guidance system for controlling movement of the swing arm 26 and a first preferred embodiment 60 of the guidance system of the present invention will now be described.

In the first preferred embodiment, the swing arm guidance system has a base unit 68 (FIG. 1) that includes a first satellite signal receiving means 70 mounted on the center pivot 12, although theoretically, this first receiving means 70 could be located in any known relatively near, stationary position. Preferably, the means 70 is a Trimble BD750 RTK GPS Receiver with an L1/L2 antenna. Prior to operation of the system 10, the means 70 is programmed with its exact latitude and longitude coordinates.

The signal receiving means 70 is capable of receiving position signals from a number of global positioning satellites 71 (only two of which are shown in FIG. 1) and generating a correction factor every second based upon a comparison of its programmed known position and that received through the GPS satellites 71.

The correction factor produced by the receiving means 70 is supplied to a radio modem 72, as indicated in FIG. 4, that also forms part of the base unit 68 and transmits the correction factor to a rover unit 73 (FIG. 2) associated with the swing tower 30. The rover unit includes a second satellite signal receiving means 74, similar to the means 70, and a rover radio modem 75 (not shown).

The radio modem 75 is on the same frequency as the radio modem 72 for receiving the correction factor transmitted thereby. The rover unit 73 is located in association with the swing arm tower 30 and generates its position information accordingly, using the correction factor that has been formulated by the receiving means 70 and transmitted by the radio modem 72, in conjunction with the position information signals received from GPS satellites 71.

The position information produced by the rover unit 73 is in the form of the longitudinal and latitudinal coordinates of the second receiving means 74 and is accurate to within 2 centimeters of the true position of such means. The rover unit position information is supplied to a central processing unit 78, that is preferably located on the swing arm 26 as part of the rover unit 73 and is a 386 computer in PC 104 format with two RS 232 communication ports.

In addition to receiving rover position information from the second receiving means 74, the CPU 78 stores information representative of a desired path 76 (FIG. 3) for the swing arm 26, which path information is produced before the system 10 can be operational. The swing arm path information is generated by walking the rover unit 73 around the field along the desired path.

The CPU 78 is programmed so that during the initial walk through, it automatically calculates the distance of the rover unit 73 and its azimuth with respect to the base unit 68 for every 0.1 degree of the change of azimuth angle. Thus, in a 360 degree circle there will be 3600 location data pairs that are saved and stored in the permanent memory of the unit 78.

Another function of the CPU 78 is to compare the rover unit location information to the stored desired path information. To be able to perform this comparison the unit 78 is programmed to convert the rover unit location information, which is in the format of a particular latitude and longitude, into the distance and azimuth format in which the desired path information is stored.

Once the above path information conversion is made, the CPU 78 compares the value of the azimuth to that stored in memory until a match is found. Upon finding a match, the actual calculated distance of the rover unit 73 from the base unit 68 is compared to the intended distance corresponding to the matching azimuth. The difference between these two distances (differential position information) is the difference or error of the actual distance of the rover unit 73 to the desired distance. Such difference is transmitted to a programmable logic controller 82 that is preferably part of the rover unit 73.

The controller 82 has a built in proportional integral derivative (PID loop) algorithm that looks at the error of the actual position of the rover unit 73 and adjusts its output accordingly. The controller 82 is designed to respond to the error distance by calculating steering signals that will cause a change in the steering of the swing tower 30 that will most efficiently move it back to its intended path. The steering signals are supplied to the steering means 36 so that the guidance system 60 controls the direction of travel of the steerable wheels 32 of the swing tower 30.

The guidance system 60 is not the only format that can be effectively used to control the steering of the swing tower 30 and a second preferred embodiment 85 of the guidance system of the present invention will now be described, which embodiment from a commercial standpoint may be the preferred system of use. Basically the system 85 operates a great deal like the system 60 but instead of preferably locating the rover unit 73 forward of the swing tower 30 the unit 73 is preferably located directly on the swing arm tower 26 and the system 85 is adopted to calculate a virtual forward position that is utilized to guide the tower 30.

An advantage of the system 85 is that it does not require the use of the programmable logic controller 82 but rather depends solely on geometric calculations made by the CPU 78 to calculate a virtual position that the swing tower 30 will travel to if no steering correction is made.

In operation, the initial position ($P_0$) of the rover unit 73 in latitude and longitude coordinates must be calculated by the CPU 78 and recorded into memory. The system 10 is then started up and the new positions of the swing arm tower 30 are determined every second. When the tower 30 has moved a preselected distance, such as one foot ($D_1$), a second position ($P_1$) of the tower is recorded. Based upon the positions $P_0$ and $P_1$ and a straight line that can be drawn therethrough to a virtual position ($P_2$) that is a second preselected distance from $P_1$, such as four feet, the CPU 78 calculates the position $P_2$ and then compares it to the appropriate position on the desired path 76 to produce differential position information.

If $P_2$ is beyond the desired path by greater than a predefined distance from such path (for example, greater than 6 inches), the CPU 78 is adapted to provide a clockwise steering signal to the swing tower 30 until the tower reaches the "no steer" tolerance. If $P_2$ is less than the desired path by greater than such predefined distance from the path, the CPU will provide a counter-clockwise steering signal to bring the tower 30 into the "no steer" tolerance. If $P_2$ is less than the predefined distance from the desired path, no steering signal will be provided to the steering motors. In this way, steering of the tower 30 is accomplished as it moves about the field based upon the foot-by-foot calculations of the virtual positions $P_2$.

Thus, the present invention provides a novel, efficient and accurate means for controlling the travel of a swing arm 26 on a center pivot irrigation system 10. Although the control means of the present invention has been described with respect to two preferred embodiments, it should be understood that such embodiments may be altered without avoiding the spirit and scope of the present invention. It is also important to note that use of GPS satellites for determining the position of the swing tower 26 also provides the system 10 with the ability to supply an optimum water pattern from the swing arm 26 depending on its position. This is accomplished by sequencing the sprinklers 54 as the swing arm 26 moves into a corner as is known in the art.

What is claimed is:

1. A guidance system for providing a steering control for a swing arm water conduit on a center pivot irrigation system having a main arm water conduit with one end pivotally connected to a central point of water supply at a known location and supported on at least one movable tower, said system comprising:
    (a) a base unit located at a known position relative to said central water point and including:
        (1) a first satellite signal receiving means for simultaneously receiving position information signals from a plurality of satellites and producing a position correction factor representative of the difference between the known position of said means and the position information received from said satellites;
        (2) means for transmitting said correction factor;
    (b) a rover unit associated with said swing arm and having:
        (1) means for receiving said correction factor from said transmitting means;
        (2) a second satellite receiving means for simultaneously receiving position information signals from a plurality of satellites and producing corrected position information of the rover unit based upon the position information signals received from said satellites as modified by said correction factor that is supplied by said first receiving means;
    (c) Computer processing means for storing position information representative of the desired path of travel of said rover unit and for comparing said corrected position information to said desired path of travel information and producing differential position information that is used to properly steer said swing arm generally on the desired path of travel by the calculation of a virtual position which the rover unit will reach in the event that the steering of said swing arm remains constant.

2. A guidance system as recited in claim 1, wherein said main arm water conduit and said swing arm water conduit have sprinkler heads and said sprinkler heads of said swing arm water conduit are sequentially actuated as the swing arm moves along said desire path of travel.

3. A guidance system as recited in claim 1, wherein said means for transmitting said correction factor and said means for receiving said correction factor are radio modems.

4. A guidance system as recited in claim 1, wherein said swing arm is supported by at least one swing tower and said rover unit is located on said swing tower.

5. A guidance system as recited in claim 1, wherein said virtual position is calculated by the determination of two different corrected positions of the swing tower to establish a straight line reference for projecting the virtual position of the swing tower at a selected length of travel.

6. A guidance system as recited in claim 5, wherein said virtual position is compared to the desired position of said swing tower and steering signals are produced in response to such comparison to steer said swing tower generally on said desired path of travel.

7. A guidance system for providing a steering control for a swing arm water conduit on a center pivot irrigation system having a main arm water conduit with one end pivotally connected to a central point of water supply at a known location and supported on at least one movable tower, said system comprising:
    (a) a base unit located at a known position relative to said central water point and including:
        (1) a first satellite signal receiving means for simultaneously receiving position information signals from a plurality of satellites and producing a position correction factor representative of the difference between the known position of said means and the position information received from said satellites;
        (2) means for transmitting said correction factor;
    (b) a rover unit associated with said swing arm and having:
        (1) means for receiving said correction factor from said transmitting means;
        (2) a second satellite receiving means for simultaneously receiving position information signals from a plurality of satellites and producing corrected position information of the rover unit based upon the position information signals received from said satellites as modified by said correction factor that is supplied by said receiving means;
    (c) computer processing means that is adapted for:
        (1) storing corrected position information of the rover unit as an initial position of the rover unit;
        (2) storing position information for a second position of the rover unit after the rover unit has traveled a first preselected distance from the initial position of the rover unit; and
        (3) calculating a virtual position of the rover unit which the rover unit will reach in the event that the steering of said swing arm remains constant, which virtual position is on a straight line formed by the initial position and the second position of said rover unit and is at a second preselected distance from said second position.

8. A guidance system as recited in claim 7 wherein said computer processing means further is adapted for storing position information representative of the desired path of travel of said rover unit.

9. A guidance system as recited in claim 8, wherein the virtual position calculated by said computer processing means is compared to the position information representative of the desired path of travel of said rover unit and a steering signal is produced as a result therefrom to properly steer said swing arm generally on the desired path of travel.

10. A guidance system as recited in claim 9 wherein said swing arm is supported on at least one swing tower.

11. A guidance system as recited in claim 10 wherein said calculated positions of said rover unit is determined by establishing the longitude and latitude of said rover unit for each of said positions.

* * * * *